US012491618B2

(12) United States Patent
Kipfelsberger

(10) Patent No.: US 12,491,618 B2
(45) Date of Patent: Dec. 9, 2025

(54) TORQUE WRENCH AS POWER WRENCH

(71) Applicant: ALKI TECHNIK GMBH SCHRAUBSYSTEME ENTWICKLUNG-PRODUKTION-VERTRIEB, Ingolstadt (DE)

(72) Inventor: Alexander Kipfelsberger, Ingolstadt (DE)

(73) Assignee: Alki Technik GmbH Schraubsysteme Entwicklung-Produktion-Vertrieb, Ingolstadt (DE)

( * ) Notice: Subject to any disclaimer, the term of this patent is extended or adjusted under 35 U.S.C. 154(b) by 419 days.

(21) Appl. No.: 17/919,332

(22) PCT Filed: Apr. 14, 2021

(86) PCT No.: PCT/EP2021/059630
§ 371 (c)(1),
(2) Date: Oct. 17, 2022

(87) PCT Pub. No.: WO2021/209488
PCT Pub. Date: Oct. 21, 2021

(65) Prior Publication Data

US 2023/0158645 A1 May 25, 2023

(30) Foreign Application Priority Data

Apr. 17, 2020 (DE) ..................... 10 2020 110 537.1

(51) Int. Cl.
*B25F 5/00* (2006.01)
*B25B 21/00* (2006.01)
(Continued)

(52) U.S. Cl.
CPC .............. *B25F 5/001* (2013.01); *B25B 21/00* (2013.01); *B25F 5/02* (2013.01); *B25B 23/0035* (2013.01);
(Continued)

(58) Field of Classification Search
CPC . B25F 5/001; B25F 5/02; B25B 21/00; B25B 23/0035; B25B 23/0078; B25B 23/145; B25B 23/147
See application file for complete search history.

(56) References Cited

U.S. PATENT DOCUMENTS 4,155,278 A * 5/1979 Estok ...................... B25B 23/00 81/57.11
4,513,827 A * 4/1985 Dubiel .................. B25B 21/008 475/266
(Continued)

FOREIGN PATENT DOCUMENTS

EP 1690638 A1 * 8/2006 ............. B25B 21/00
EP 2147750 A1 * 1/2010 ............. B25B 21/00
(Continued)

*Primary Examiner* — Michelle Lopez
(74) *Attorney, Agent, or Firm* — Laurence A. Greenberg; Werner H. Stemer; Ralph E. Locher

(57) ABSTRACT

A torque wrench such as a power wrench has a drive motor with an intermediate gearbox connected downstream of the drive motor and with a bolting gearbox connected downstream of the intermediate gearbox as a planetary gearbox with a bolting tool part on the output side, and with a housing with at least one handle in which the drive motor and the intermediate gearbox are arranged in sequence. The drive motor is non-rotatably arranged and fixed in the housing, and the intermediate gearbox is rotatably mounted in the housing and is non-rotatably connected to a ring gear of the planetary gearbox, so that, during a bolting operation, only the reaction forces occurring on the housing as a result of the drive motor have to be supported by an operator, and the reaction forces occurring as a result of the intermediate gearbox are supported by the torque support foot.

12 Claims, 4 Drawing Sheets

(51) Int. Cl.

| | |
|---|---|
| ***B25B 23/00*** | (2006.01) |
| ***B25B 23/145*** | (2006.01) |
| ***B25B 23/147*** | (2006.01) |
| ***B25F 5/02*** | (2006.01) |

(52) U.S. Cl.
CPC ......... *B25B 23/0078* (2013.01); *B25B 23/145* (2013.01); *B25B 23/147* (2013.01)

(56) References Cited

U.S. PATENT DOCUMENTS

| | | | | |
|---|---|---|---|---|
| 7,225,707 | B2 * | 6/2007 | Knopp .................... | B25B 21/00 81/57.14 |
| 2005/0279198 | A1 * | 12/2005 | Kushida .............. | B25B 23/0078 81/469 |
| 2006/0005637 | A1 | 1/2006 | Hirai et al. | |
| 2007/0056408 | A1 * | 3/2007 | Knopp .................... | B25B 21/00 81/57.14 |
| 2013/0104702 | A1 * | 5/2013 | Hellstrom ........... | B25B 23/0007 81/54 |
| 2018/0229350 | A1 | 8/2018 | Naoi et al. | |
| 2019/0224836 | A1 * | 7/2019 | Fortoloczki ........... | B25B 21/008 |

FOREIGN PATENT DOCUMENTS

| | | | |
|---|---|---|---|
| WO | 2011098923 | A2 | 8/2011 |
| WO | 2018160230 | A1 | 9/2018 |

* cited by examiner

TORQUE WRENCH AS POWER WRENCH

FIELD AND BACKGROUND OF THE INVENTION

The invention relates to a torque wrench as a power wrench according to the preamble of the independent claim.

Torque wrenches, so-called power wrenches, are hand-held bolting devices for large bolting connections. Such torque wrenches are generally known in various designs for torque ranges between approx. 150 Nm and 10000 Nm.

In principle, such torque wrenches have a multi-stage design: a relatively high-speed drive motor, for example an electric motor, and a downstream intermediate gearbox are arranged in series in a housing with at least one handle. In addition, known torque wrenches are usually designed as so-called shut-off wrenches, which switch off automatically after being switched on when a presettable bolting torque is reached. The necessary actuation, display and control elements are contained in the housing serving as motor and electronics housing. Downstream of the intermediate gearbox and adjacent to the housing is a heavy, stable bolting gearbox in the form of a planetary gearbox for the high torques required in a bolting operation. The planetary gear has an outer ring gear to which, in particular in contrast to a simple hand drill, a radially projecting torque support foot is attached. During a screwing/bolting operation, this torque support foot pivots against a fixed support point required in the vicinity of the bolting operation and supports there the high reaction forces occurring at the planetary gear, which could no longer be supported by hand by an operator.

In the case of a rotationally fixed connection between the housing and the planetary gear, the ring gear would swivel together with the torque support foot and the hand-guided housing during a bolting process until the torque support foot would rest against its fixed support point. This would create the risk that, in tight spaces and with the large torques that occur during a bolting operation, the housing and/or parts of an operator's body could be swiveled with great force against an obstacle and jammed. For safety reasons and to protect operators, the rotary motion of the outer sun gear of the bolt drive is therefore decoupled from the rotary motion of the hand-guided housing, for example by the ring gear of the planetary gear being rotatably mounted in an end ring part of the housing that partially overlaps the ring gear.

In known torque wrenches, the drive motor, in particular an electric motor, and the downstream intermediate gearbox are arranged in the housing so that they cannot rotate. In typical arrangements, motor output torques of approx. 1 Nm occur during a tightening operation. With the intermediate gearbox downstream of the drive motor, which is held in the housing so that it cannot rotate, the output speed of the drive motor is reduced by a predetermined reduction ratio with a correspondingly increased intermediate gearbox output torque. Typically, a reduction ratio of about 10:1 is selected with a corresponding 10-fold output torque of about 10 Nm. Due to the rotatable connection between the hand-guided housing and the heavy bolting gearbox in the form of a planetary gearbox explained above, in this previous arrangement only the reaction forces occurring at the planetary gearbox are supported by the torque support foot, while the intermediate gearbox output torque must be supported by an operator by hand.

The above-mentioned typical intermediate gearbox output torques of approx. 10 Nm, which have to be supported by an operator as reaction forces, require a great deal of effort, which makes working with a torque wrench over a long period of time strenuous and arduous. In addition, designs and dimensioning with higher intermediate gearbox output torques are not possible and are limited by the robustness of operators.

SUMMARY OF THE INVENTION

It is an object of the invention to develop a torque wrench in the form of a power wrench in such a way that the reaction forces occurring on a hand-guided housing during a bolting operation, which have to be supported by an operator, are reduced.

This object is solved by means of the features of the independent claim. Advantageous embodiments are part of the subclaims referring back thereto.

According to the independent claim, a torque wrench is provided in the form of a power wrench having a drive motor with a predetermined, preferably high, speed and predetermined motor output torque. Furthermore, an intermediate gearbox is provided downstream of the drive motor, which reduces the output speed of the drive motor with a predetermined reduction ratio, preferably at a correspondingly increased intermediate gearbox output torque. In addition, a bolting gearbox is provided downstream of the intermediate gearbox with a bolting tool part on the output side, the bolting gearbox reducing the output speed of the intermediate gearbox with a predetermined reduction ratio, preferably at a correspondingly increased bolting gearbox output torque which is required for a specific bolting operation. Furthermore, a housing with at least one handle is provided, in which the drive motor and the intermediate gearbox are arranged in sequence, it being preferably provided that the housing is to be held by an operator at the at least one handle during a bolting operation and/or reaction forces occurring at the housing are to be supported as rotational forces. The bolting gearbox is a planetary gearbox with an outer ring gear with internal toothing, the ring gear being rotatably mounted on the housing and having a radially projecting torque support foot which, during a bolting operation, pivots against a required fixed support point and supports there the reaction forces occurring on the planetary gearbox.

According to the invention, the drive motor is non-rotatably arranged and fixed in the housing, and the intermediate gearbox is rotatably mounted in the housing and is non-rotatably connected to the ring gear. As a result, only the reaction forces occurring on the housing due to the drive motor need to be supported by an operator during a screwing/bolting process and/or the reaction forces occurring due to the intermediate gearbox are additionally supported with the torque support foot during a bolting process.

In other words, in the arrangement according to the invention, too, the drive motor is non-rotatably arranged and fixed in the housing. However, the intermediate gear box is mounted rotatably in the housing and is connected non-rotatably to the ring gear of the planetary gear box. During a screwing/bolting process, only the reaction forces occurring at the housing due to the drive motor occur, which, as explained above, can typically be dimensioned in the order of 1 Nm and are to be supported by an operator. The higher reaction forces occurring due to the intermediate gear box are additionally supported by the torque support foot due to the non-rotatable connection with the ring gear.

With the arrangement according to the invention, the reaction forces occurring at the housing can be greatly reduced for effort-saving and convenient handling compared to the state of the art and/or clearances for dimensioning with higher intermediate gear box output torques become possible, since, if necessary, relatively low output torques of the drive motor can still be well supported by hand.

In principle, the arrangement according to the invention is possible with different motors, in particular with electric motors, although pneumatic motors or hydraulic motors can also be used if necessary.

In one specific embodiment, a handle can be arranged on the housing as a pistol grip. In an embodiment as a cordless wrench with an electric motor, a receptacle for an energy storage device, for example a rechargeable battery, for supplying energy to the electric motor can be attached to the pistol grip.

The torque support foot can be designed to be removable, whereby an external toothing is attached to the ring gear in a partial area of it, onto which a connection ring of the torque support foot with associated internal toothing can be attached and fixed.

Furthermore, the output of the planetary gear box can be designed as an output polygon, for example as an output square, onto which an exchangeable socket can be fitted as a bolting tool part.

A simple design according to the invention results when the output rotary shafts of the drive motor, the intermediate gearbox and the planetary gearbox are concentrically aligned and the inner area of the housing is cylindrical in its basic shape. In principle, however, angular arrangements are also possible.

In a particularly preferred concrete arrangement, the rotatable mounting of the intermediate gear box in the housing is implemented in such a way that, on the one hand, an adapter ring is rotatably mounted on a shaft section between the drive motor and the intermediate gearbox, to which an adjacent region of the intermediate gearbox, in particular an intermediate gearbox housing region overlapping the adapter ring, is rotatably connected. On the other hand, a toothed disc is arranged concentrically on an opposite region of the intermediate gearbox, in particular an intermediate gearbox housing region, if necessary via a driver ring, and is non-rotatably connected, which toothed disc engages with its external toothing in the internal toothing of the ring gear. This ensures on the one hand the rotatability of the intermediate gearbox in the housing and on the other hand the non-rotatable connection with the ring gear. The planetary gearbox can be plugged together with the housing and mounted as a separate component. An output pinion of the intermediate gearbox is guided through a central opening in the toothed pulley and engages in the planetary gearbox, where it meshes in particular with a planetary gear.

The reduction ratio of the intermediate gearbox is preferably of the order of 1:10. Alternatively or additionally, it is provided that the motor output torque is of the order of 1 Nm and the intermediate gearbox output torque is of the order of 10 Nm.

The arrangement according to the invention can advantageously be used in conjunction with a wrench design in the form of a shut-off wrench, which automatically switches off when a presettable bolting torque is reached.

Furthermore, a method is also claimed. The advantages achievable with the method according to the invention are identical to those of the torque wrench according to the invention, so that reference is made to the explanations previously given in order to avoid repetition.

With the aid of a drawing, embodiments of the invention are further explained merely by way of example.

DETAILED DESCRIPTION OF THE INVENTION

Figure 1:
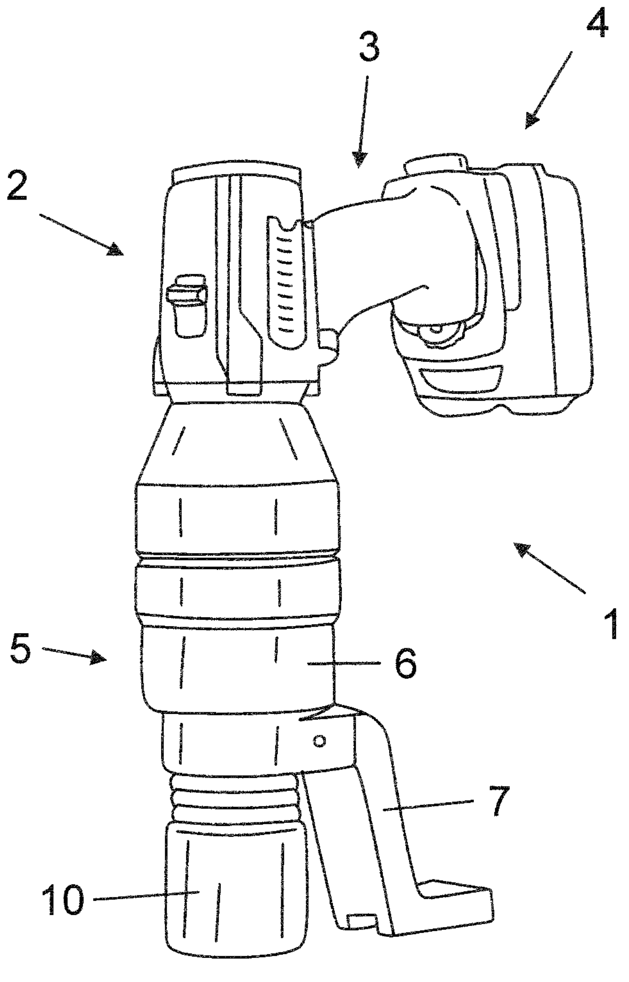
FIG. 1 a perspective view of a torque wrench as a power wrench with a torque support foot, FIG. 2 a side view of a similar torque wrench without a support foot, FIG. 3 a schematic longitudinal section through a housing and a part of a bolting gearbox, FIG. 4 a top view onto a sun gear of the bolting gearbox.

In FIG. 1, a torque wrench 1 is shown as a cordless bolt wrench with a housing 2, with a handle 3 as a pistol grip, to the end of which is attached a receptacle 4 for a battery, for example, as an energy storage device for supplying energy to an electric motor 13 arranged in the housing 2 as a drive motor.

Figure 2:
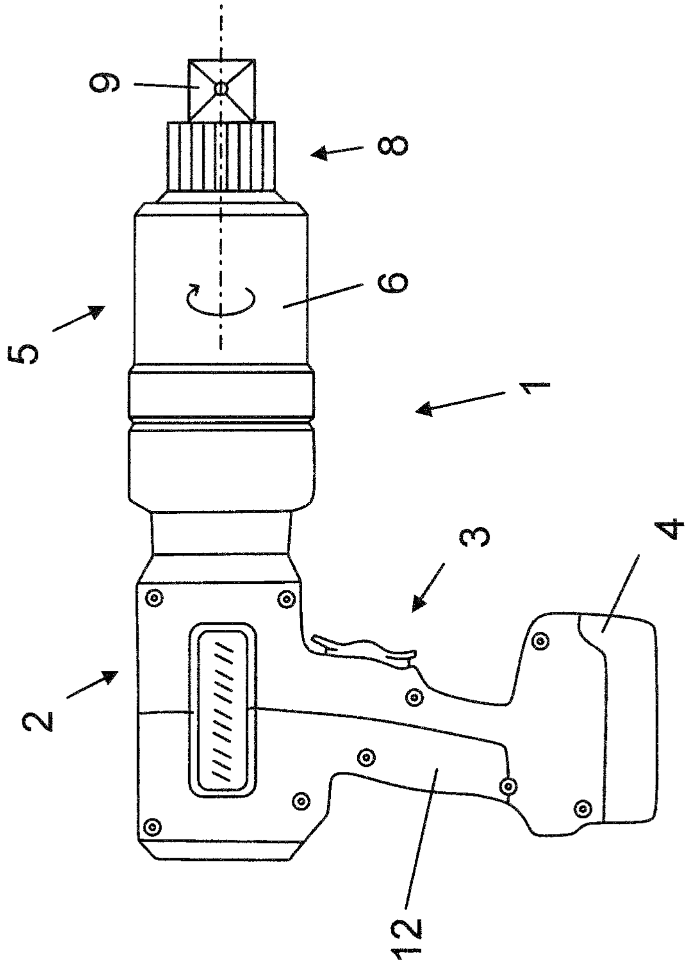

A bolting gearbox 5 with an outer sun gear 6 is rotatably connected to the housing 2, to which a torque support foot 7 is attached in a non-rotatable manner. As shown in FIG. 2, an external toothing 8 is attached to a section of the sun gear 6, onto which the torque support foot 7 can be fitted and fixed with an associated internal toothing.

FIG. 2 also shows that the output of the bolting gearbox 5 is designed as an output polygon, here exemplarily as an output square 9, onto which an exchangeable socket 10 can be plugged as a bolting tool part.

Figure 3:
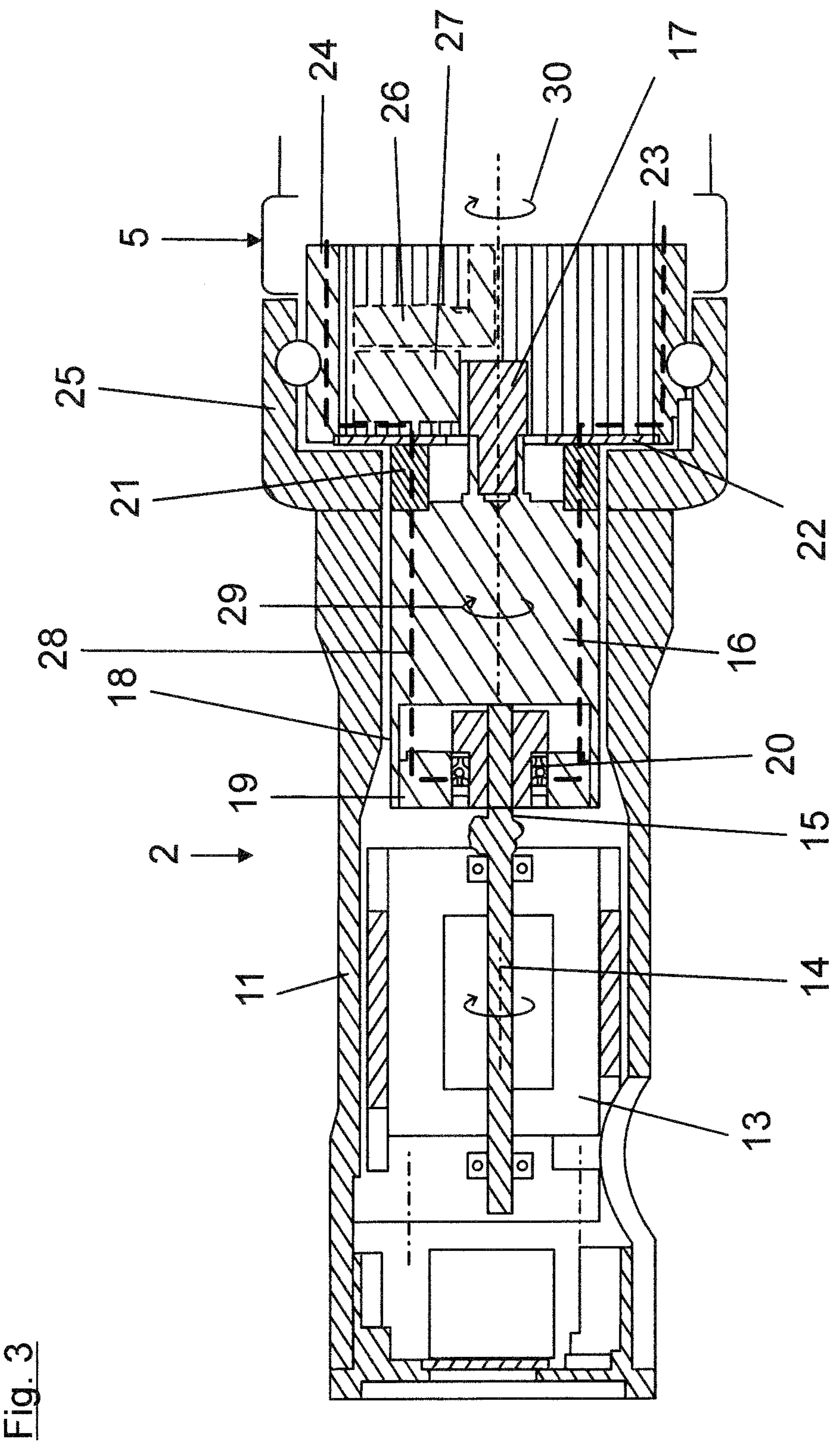

As can be seen from FIG. 2 in conjunction with the longitudinal section shown in FIG. 3, the housing 2 is made up of several parts and consists in particular of a stable housing inner part 11 onto which shell parts 12 are fitted and fixed to form the handle 3 and to accommodate switching, control and display elements.

In the housing inner part 11 of relevance for the invention according to FIG. 3, further generally referred to as housing 2, an electric motor 13, preferably rotating relatively quickly, with a rotary shaft 14 is arranged and shown schematically. During a bolting operation, with the design adopted here, torques in the order of approximately 1 Nm, for example, occur at the rotary shaft, in particular at an output-side shaft section 15.

The electric motor 13 is followed by a schematically shown intermediate gearbox 16, which here reduces the speed of the electric motor 13 with a reduction ratio of 10:1, whereby an intermediate gearbox output torque of approximately 10 Nm occurs at an output pinion 17 of the intermediate gearbox 16.

The intermediate gearbox 16 has an intermediate gearbox housing section 18 projecting towards the electric motor 13, which is connected to an adapter ring 19 in a non-rotatable manner. The adapter ring 19 is rotatably mounted on the shaft section 15 of the rotary shaft 14 by means of a ball bearing 20.

At the opposite end of the intermediate gearbox 16, a driver ring 21 is non-rotatably connected to the intermediate gearbox housing, to which in turn a toothed disc 22 is attached at the end. The external toothing of the toothed disk 22 engage in the internal toothing 23 of a ring gear 24 of the bolting gearbox 5 in the form of a planetary gearbox. One section of the ring gear 24 is rotatably inserted into a receiving ring part 25 at the end of the housing 2. The further structure of the bolting gearbox 5 is not relevant according to the invention and is therefore not shown further. Only in the upper area of the ring gear 24 is schematically shown a part of a planetary gear carrier 26 with a planetary gear 27, in which the output pinion 17 engages.

The thick dashed line 28 and the rotary arrows 29 and 30 are intended to illustrate that the intermediate gearbox 16 is rotatably arranged in the housing 2 and has a non-rotatable connection to the bolting gearbox 5 or the ring gear 24 and thus to the torque support foot 7, whereby the intermediate gearbox output torque is also supported by the torque support foot 7. During a bolting process, only the comparatively small motor output torque is applied to the housing 2 as a reaction force, which must be supported by an operator as a reaction force.

Figure 5:
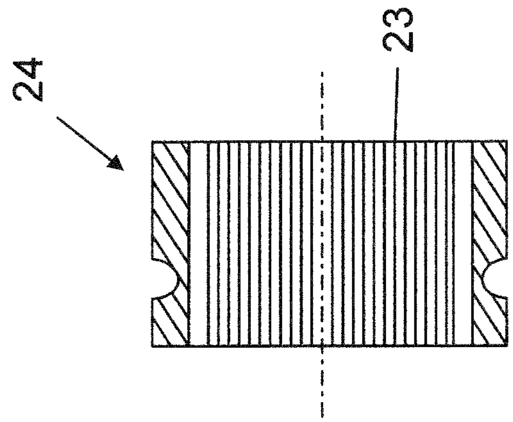
FIG. 5 is a longitudinal sectional view of the ring gear.
Figure 4:
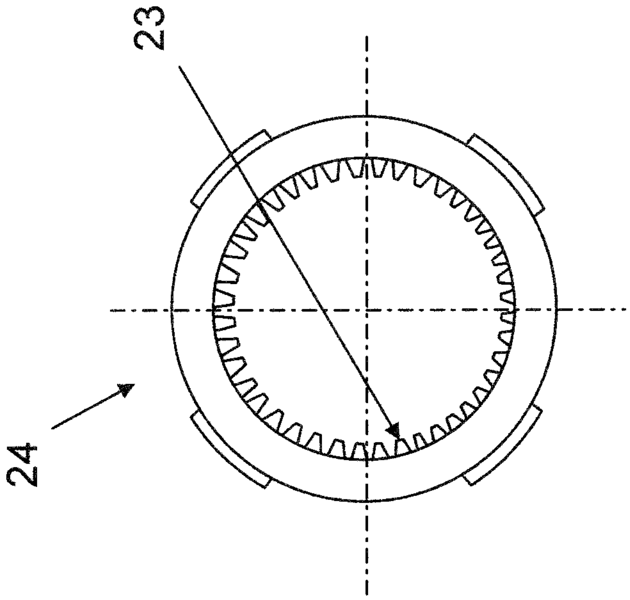

FIG. 4 shows a top view of the ring gear 24 with its internal toothing 23, and FIG. 5 shows a corresponding longitudinal section. As shown, the external toothing of the toothed disk 22 engage in the internal toothing 23 for a non-rotatable connection with the intermediate gearbox 16.

LIST OF REFERENCE SIGNS

1 torque wrench
2 housing
3 handle
4 receptacle
5 bolting gearbox
6 sun gear
7 torque support foot
8 outer toothing
9 drive square
10 socket
11 internal part of the housing
12 shell parts
13 electric motor
14 rotary shaft
15 shaft section
16 intermediate gearbox
17 output pinion
18 intermediate gearbox housing area
19 adapter ring
20 ball bearing
21 driver ring
22 toothed disc
23 internal thoothing
24 ring gear
25 receiving ring part
26 planet gear carrier
27 planetary gear
28 line
29 rotary arrow
30 rotary arrow

The invention claimed is:

1. A torque wrench, comprising:
a drive motor with a predetermined speed and a predetermined motor output torque;
an intermediate gearbox connected downstream of said drive motor and reduces an output speed of said drive motor with a predetermined reduction ratio;
a bolting gearbox connected downstream of said intermediate gearbox and having a bolting tool part on an output side, said bolting gearbox reducing an output speed of said intermediate gearbox with a predetermined reduction ratio;
a housing with at least one handle, said drive motor and said intermediate gearbox are disposed in said housing in sequence, said housing having an inner region being cylindrical in its basic shape;
said bolting gearbox being a planetary gearbox with an external ring gear with internal toothing, said external ring gear being rotatably mounted on said housing and having a radially projecting torque support foot which, during a bolting operation, pivots against a required fixed support point and supports there reaction forces occurring on said planetary gearbox;
a concentric toothed disc having a central opening formed therein;
an adapter ring for a rotatable mounting of said intermediate gearbox in said housing and a non-rotatable connection to said external ring gear, said adapter ring rotatably mounted on a shaft section between said drive motor and said intermediate gearbox, and to said adapter ring said intermediate gearbox is non-rotatably connected and that, on an opposite region of said intermediate gearbox, said concentric toothed disc is disposed and non-rotatably connected;
said concentric toothed disc having outer toothing engaging in said internal toothing of said external ring gear;
said drive motor being non-rotatably disposed and fixed in said housing and said intermediate gearbox being rotatably mounted in said housing and is non-rotatably connected to said external ring gear;
said drive motor, said intermediate gearbox and said planetary gearbox each have an output rotary shaft and said output rotary shaft of said drive motor, said intermediate gearbox and said planetary gearbox are concentrically aligned; and
said intermediate gearbox having an output pinion being guided through said central opening of said concentric toothed disc and engaging in said planetary gearbox.

2. The torque wrench according to claim 1, wherein said drive motor is a pneumatic motor or a hydraulic motor or an electric motor rotating at a high speed relative to the output speed of said bolting gearbox.

3. The torque wrench according to claim 1,
further comprising an energy store; and
wherein said housing has a pistol grip as said at least one handle and a receptacle for said energy store for supplying energy to said drive motor being an electric motor, said receptacle is fitted on said pistol grip.

4. The torque wrench according to claim 3, wherein said energy store is a rechargeable battery.

5. The torque wrench according to claim 1,
wherein said external ring gear is a sun gear;
wherein said radially projecting torque support foot has a connecting ring with internal toothing; and
further comprising an external toothing attached to said sun gear in a partial region of said sun gear, onto which said connecting ring of said radially projecting torque support foot with said internal toothing is attachable and fixable.

6. The torque wrench according to claim 1, wherein:
said planetary gearbox outputs an output polygon; and
said bolting tool part is an exchangeable, attachable socket.

7. The torque wrench according to claim 6, wherein said planetary gearbox outputs an output square.

8. The torque wrench according to claim 1, wherein the torque wrench is configured as a shut-off wrench which automatically switches off when a presettable bolting torque is reached.

9. The torque wrench according to claim 1, wherein:
the torque wrench is a power wrench;
said intermediate gearbox connected downstream of said drive motor reduces the output speed of said drive motor with the predetermined reduction ratio and with a correspondingly increased intermediate gearbox output torque;

said bolting gearbox reducing the output speed of said intermediate gearbox with the predetermined reduction ratio at a correspondingly increased bolting gearbox output torque which is required for a specific bolting operation;

said housing is to be held by an operator at said at least one handle during the bolting process and reaction forces occurring at said housing are to be supported as rotational forces; and said intermediate gearbox is rotatably mounted in said housing and is non-rotatably connected to said ring gear in such a way that, during the bolting operation, only the reaction forces occurring on said housing as a result of said drive motor are to be supported by the operator and/or the reaction forces occurring as a result of said intermediate gearbox are additionally supported by said radially projecting torque support foot.

10. The torque wrench according to claim 1, wherein to said adapter ring, said intermediate gearbox, in an intermediate gearbox housing region, is non-rotatably connected and that, on said opposite region of said intermediate gearbox, on an intermediate gearbox housing region said concentric toothed disc is disposed and non-rotatably connected.

11. A torque wrench, comprising:

a drive motor with a predetermined speed and a predetermined motor output torque;

an intermediate gearbox connected downstream of said drive motor and reduces an output speed of said drive motor with a predetermined reduction ratio;

a bolting gearbox connected downstream of said intermediate gearbox and having a bolting tool part on an output side, said bolting gearbox reducing an output speed of said intermediate gearbox with a predetermined reduction ratio;

a housing with at least one handle, said drive motor and said intermediate gearbox are disposed in said housing in sequence;

said bolting gearbox being a planetary gearbox with an external ring gear with internal toothing, said external ring gear being rotatably mounted on said housing and having a radially projecting torque support foot which, during a bolting operation, pivots against a required fixed support point and supports there reaction forces occurring on said planetary gearbox;

said drive motor being non-rotatably disposed and fixed in said housing and said intermediate gearbox being rotatably mounted in said housing and is non-rotatably connected to said external ring gear;

the predetermined reduction ratio of said intermediate gearbox is in an order of 1:10, and/or said predetermined motor output torque of said drive motor is in an order of 1 Nm and an output torque of said intermediate gearbox is 10 Nm.

12. A method for performing a bolting operation, which comprises the steps of:

providing a torque wrench, containing:

a drive motor with a predetermined speed and a predetermined motor output torque;

an intermediate gearbox connected downstream of the drive motor, and reduces an output speed of the drive motor with a predetermined reduction ratio;

a bolting gearbox connected downstream of the intermediate gearbox and having a bolting tool part on an output side, the bolting gearbox reducing an output speed of the intermediate gearbox with a predetermined reduction ratio;

a housing with at least one handle, in the housing the drive motor and the intermediate gearbox are disposed in sequence;

the bolting gearbox being a planetary gearbox with an external ring gear with internal toothing, the external ring gear being rotatably mounted on the housing and having a radially projecting torque support foot which, during the bolting operation, pivots against a required fixed support point and supports there reaction forces occurring on the planetary gearbox;

the drive motor is non-rotatably disposed and fixed in the housing and the intermediate gearbox is rotatably mounted in the housing and is non-rotatably connected to the external ring gear, so that, during the bolting operation, only the reaction forces occurring at the housing due to the drive motor have to be supported by an operator and/or the reaction forces occurring due to the intermediate gearbox are additionally supported by the torque support foot;

the predetermined reduction ratio of the intermediate gearbox is in an order of 1:10, and/or the predetermined motor output torque of the drive motor is in an order of 1 Nm and an output torque of the intermediate gearbox is 10 Nm; and holding the housing by the operator at the at least one handle during the bolting operation and the reaction forces occurring at the housing are to be supported as rotational forces.

* * * * *